(12) United States Patent
Kim et al.

(10) Patent No.: US 10,263,435 B2
(45) Date of Patent: Apr. 16, 2019

(54) APPARATUS AND METHOD OF CHARGING MODULES OF BATTERY PACK BASED ON SET CHARGING GROUPS

(71) Applicant: Samsung Electronics Co., Ltd., Suwon-si (KR)

(72) Inventors: Jin Ho Kim, Yongin-si (KR); Dae Ryong Jung, Seoul (KR); Young Jae Kim, Seoul (KR); Tae Won Song, Yongin-si (KR); Tae Jung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 15/413,178

(22) Filed: Jan. 23, 2017

(65) Prior Publication Data
US 2017/0214253 A1    Jul. 27, 2017

(30) Foreign Application Priority Data

Jan. 21, 2016  (KR) .................. 10-2016-0007743
Dec. 28, 2016  (KR) .................. 10-2016-0180915

(51) Int. Cl.
*H02J 7/00*    (2006.01)
(52) U.S. Cl.
CPC .......... *H02J 7/0018* (2013.01); *H02J 7/0013* (2013.01); *H02J 7/0021* (2013.01)
(58) Field of Classification Search
CPC ....... H02J 7/0018; H02J 7/0013; H02J 7/0021
See application file for complete search history.

(56) References Cited

U.S. PATENT DOCUMENTS

| | | | |
|---|---|---|---|
| 6,181,106 B1 * | 1/2001 | Finger | H02J 7/0019 320/119 |
| 6,281,661 B2 | 8/2001 | Kaite et al. | |
| 6,346,794 B1 | 2/2002 | Odaohhara | |
| 7,176,654 B2 * | 2/2007 | Meyer | H02J 7/0004 320/110 |

(Continued)

FOREIGN PATENT DOCUMENTS

| | | |
|---|---|---|
| JP | 11-285161 A | 10/1999 |
| JP | 2000-277167 A | 10/2000 |

(Continued)

OTHER PUBLICATIONS

European Search Report dated Jul. 3, 2017 in corresponding European Patent Application No. 17152415.0 (7 pages in English).

*Primary Examiner* — Naum Levin
(74) *Attorney, Agent, or Firm* — NSIP Law

(57) ABSTRACT

A battery pack charging apparatus includes battery modules assigned to charging groups, the battery pack charging apparatus includes a charging factor setter configured to set charging factors of charging groups of the battery pack based on battery information; a sequential charger configured to sequentially charge the charging groups of the battery pack based on the charging factors of the set charging groups; and a charging controller configured to control charging of the charging groups based on either one or both of an individual group control factor and a pack control factor while the charging groups are sequentially charged.

31 Claims, 11 Drawing Sheets

(56) References Cited

U.S. PATENT DOCUMENTS

| | | | |
|---|---|---|---|
| 7,196,494 B2* | 3/2007 | Baumgartner | H02J 7/0008 320/116 |
| 8,258,755 B2* | 9/2012 | Yang | H02J 7/0014 320/103 |
| 8,638,070 B2 | 1/2014 | Maluf et al. | |
| 8,823,324 B2 | 9/2014 | Brandon, II | |
| 8,952,654 B2 | 2/2015 | Uramoto et al. | |
| 8,970,179 B2* | 3/2015 | Zhong | H01M 10/441 320/139 |
| 9,415,699 B2* | 8/2016 | Morioka | H01M 10/441 |
| 9,768,978 B2* | 9/2017 | Coenen | H02J 7/0014 |
| 9,800,064 B2* | 10/2017 | Hwang | H02J 7/0013 |
| 9,966,780 B2* | 5/2018 | Sherstyuk | H01M 10/425 |
| 2008/0252261 A1 | 10/2008 | Seo | |
| 2012/0187920 A1* | 7/2012 | Zhong | H01M 10/441 320/139 |
| 2013/0033102 A1* | 2/2013 | Goff | H02J 7/0014 307/10.6 |
| 2014/0285135 A1* | 9/2014 | Ji | B60L 11/1875 320/103 |
| 2015/0333543 A1* | 11/2015 | Hempel | B60L 11/1855 320/129 |
| 2015/0372513 A1 | 12/2015 | Choi et al. | |

FOREIGN PATENT DOCUMENTS

| | | |
|---|---|---|
| JP | 2001-128384 A | 5/2001 |
| JP | 2001-211558 A | 8/2001 |
| KR | 10-1542112 B1 | 8/2015 |

* cited by examiner

APPARATUS AND METHOD OF CHARGING MODULES OF BATTERY PACK BASED ON SET CHARGING GROUPS

CROSS-REFERENCE TO RELATED APPLICATION(S)

This application claims the benefit under 35 USC 119(a) of Korean Patent Application Nos. 10-2016-0007743 filed on Jan. 21, 2016 and 10-2016-0180915 filed on Dec. 28, 2016, in the Korean Intellectual Property Office, the entire disclosure of which is incorporated herein by reference for all purposes.

BACKGROUND

Field

The following description relates to an apparatus and a method of charging a battery pack including a plurality of battery module or battery cells.

Description of Related Art

In recent times, use of batteries in electric vehicles and other high-performance applications is rapidly increasing, and capacities of batteries are also increasing. As the capacities of the batteries increase, demands for a quick charging technology for batteries are gradually increasing. As quick charging methods for batteries, various methods are being developed. While there may be a trade-off relationship between battery charging speed and battery lifetime, such reduction of battery lifetime can be ameliorated and delayed while still improving the charging speed through a pulse charging method. In a conventional pulse charging method, there is a pause period of a constant duration after pulse charging at a high current. Here, a magnitude of a pulse, a pulse maintaining duration, a waveform, a pause period, and so on, can be designed using various methods. In conventional research, a charging algorithm is deduced using voltage, temperature and internal parameters (overvoltage and the like) of a battery cell or a pack.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to a general aspect, a battery pack charging apparatus includes battery modules assigned to charging groups, the battery pack charging apparatus includes a charging factor setter configured to set charging factors of charging groups of the battery pack based on battery information; a sequential charger configured to sequentially charge the charging groups of the battery pack based on the charging factors of the set charging groups; and a charging controller configured to control charging of the charging groups based on either one or both of a individual group control factor and a pack control factor while the charging groups are sequentially charged.

The battery pack charging apparatus may further include a group setter configured to set the charging groups using either one or both of battery cells and battery modules of the battery pack as a standard unit based on any one or any combination of two or more of performance of the battery cell or the battery module, a maximum allowable peak power and a state of health (SOH) of the battery pack charging apparatus.

The battery pack charging apparatus may further include a monitor configured to monitor a charging state during charging of the charging groups and collect the battery information using at least one unit of the battery cell, the battery module and the charging group, wherein the group setter is further configured to adjust the charging groups based on the battery information collected according to progress of the charging of the charging groups.

The charging factor of each of the charging groups may include any one or any combination of two or more of magnitude of a pulse current, a pulse current maintaining duration, and a pulse period of the charging group.

The sequential charger may be further configured to sequentially apply a pulse current to the charging groups according to the set charging factors of the charging groups and to apply a pulse current to the next charging group during a pause duration of a previous charging group.

The charging controller may be further configured to determine whether the charging group reaches a charging condition during charging thereof and to generate a comparison result by comparing either one or both of the individual group control factor and the pack control factor with a preset critical value to adjust the charging factor of the charging group based on the comparison result when the charging group has not reached the charging condition.

The charging controller may be further configured to generate a compared result by comparing the pulse maintaining duration of the adjusted charging factors to a preset minimum maintaining duration and to initialize the pulse maintaining duration to an initial value based on the compared result.

The charging controller may be further configured to adjust the pulse current magnitudes of the charging groups to the common pulse magnitude when the pulse maintaining duration is initialized.

The charging condition may include whether the charging group is fully charged and either one or both of a charging amount and a charging duration when the charging group is not fully charged.

The individual group control factor may include any one or any combination of two or more of a voltage, overpotential, ion concentration distribution, and temperature, and the pack control factor includes any one or any combination of two or more of a temperature deviation, an SOC deviation and a state of charge (SOH) deviation.

The charging controller may be further configured to adjust the charging factor of the charging group based on a maximum current of the charging group according to an SOC.

The charging controller may be further configured to determine whether group liaison control is performed based on a charging condition and battery information of the charging groups and to adjust the charging factors of the charging groups through group liaison according to a ratio of the charging groups reaching the charging condition when the liaison control of the charging groups is determined.

The charging controller may be further configured to initialize the pulse maintaining duration of the charging group in which the pulse maintaining duration is adjusted to be smaller than the minimum maintaining duration to an initial value, and adjust the pulse maintaining duration of the other charging group according to a ratio reaching the charging condition of each of the charging groups.

According to another general aspect, a method of charging a battery pack includes battery modules established into charging groups, the method including setting charging factors of charging groups of the battery pack based on battery information; sequentially charging the charging groups of the battery pack based on the set charging factors of the charging groups; and controlling charging of the charging groups based on either one or both of a individual group control factor and a pack control factor while the charging groups are sequentially charged.

The battery pack charging method may further include: setting the charging groups using either one or both of battery cells or battery modules of the battery pack as a standard unit based on any one or any combination of two or more of performance of the battery cell or the battery module, a maximum allowable peak power and an SOH of the battery pack charging method.

The battery pack charging method may further include: monitoring a charging state during charging of one of the charging groups and collecting the battery information of at least one unit of the battery cell, the battery module and the charging group, wherein in the setting of the charging groups, the charging groups are adjusted based on battery information collected as the charging of the charging groups is being performed.

The charging factors of the charging groups may include any one or any combination of two or more of a magnitude of a pulse current of each of the charging groups, a pulse current maintaining duration and a pulse period.

In performing the sequential charging, the pulse current may be sequentially applied to the charging groups according to the set charging factor of the charging group, and the pulse current may be applied to the next charging group during a pause duration of a previous charging group to which the pulse current is applied.

In the controlling of the charging of the charging groups, whether a charging group reaches the charging condition during the charging may be determined, and when the charging group does not reach the charging condition, a comparison result may be generated by comparing either one or both of the individual group control factor and the pack control factor with a preset critical value and the charging factor of the charging group is adjusted based on the comparison result.

In the controlling of the charging of the charging groups, a compared result may be generated by comparing the pulse maintaining duration of the adjusted charging factors with a preset minimum maintaining duration and the pulse maintaining duration may be initialized to an initial value based on the compared result.

In the controlling of the charging of the charging groups, the pulse current magnitudes of the charging groups may be adjusted to a common pulse current magnitude when the pulse maintaining duration is initialized.

The charging condition may include whether the full charging is achieved, and either one or both of a charging amount and a charging duration when the full charging is not achieved.

The individual group control factor may include any one or any two or more of a voltage, overpotential, ion concentration distribution and temperature, and the pack control factor may include either one or both of a temperature deviation, an SOC deviation and an SOH deviation.

In the controlling of the charging of the charging groups, the charging factor of a charging group may be adjusted based on a maximum current of the charging groups according to an SOC.

In the controlling of the charging of the charging groups, when whether the group liaison control is achieved may be determined based on a charging condition and the battery information of a charging group and the liaison control of the charging groups may be determined, the charging factors of the charging groups may be adjusted according to a ratio reaching the charging condition of the charging groups.

In the controlling of the charging of the charging groups, the pulse maintaining duration of the charging group in which the pulse maintaining duration may be adjusted to be smaller than the minimum maintaining duration may be initialized to an initial value, and the pulse maintaining duration of the other charging group may be adjusted according to a ratio reaching the charging condition of each of the charging groups.

According to another general aspect, a battery pack charging apparatus including battery modules established into charging groups, the battery pack charging apparatus includes a processor, wherein the processor is configured to set charging factors of charging groups of a battery pack based on battery information, to sequentially charge the charging groups of the battery pack based on the charging factors of the set charging groups, and to control charging of the charging groups based on either one or both of a individual group control factor and a pack control factor while the charging groups are sequentially charged.

According to another general aspect, a battery management system includes a battery including battery modules; and a battery management apparatus configured to sequentially charge charging groups of the battery and to control charging of the charging groups based on either one or both of a individual group control factor and a pack control factor while the charging groups are sequentially charged.

Other features and aspects will be apparent from the following detailed description, the drawings, and the claims.

Figure 1:
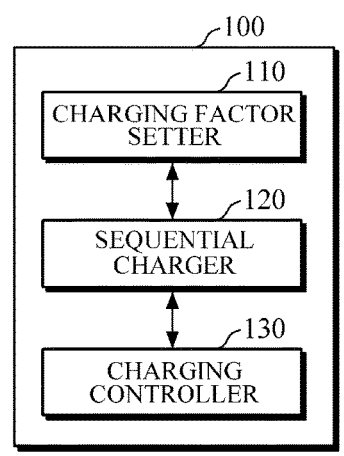
FIG. 1 is a block diagram illustrating a battery pack charging apparatus according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments of an apparatus and a method of charging a battery pack will be described in detail with reference to the accompanying drawings.

Figure 2:
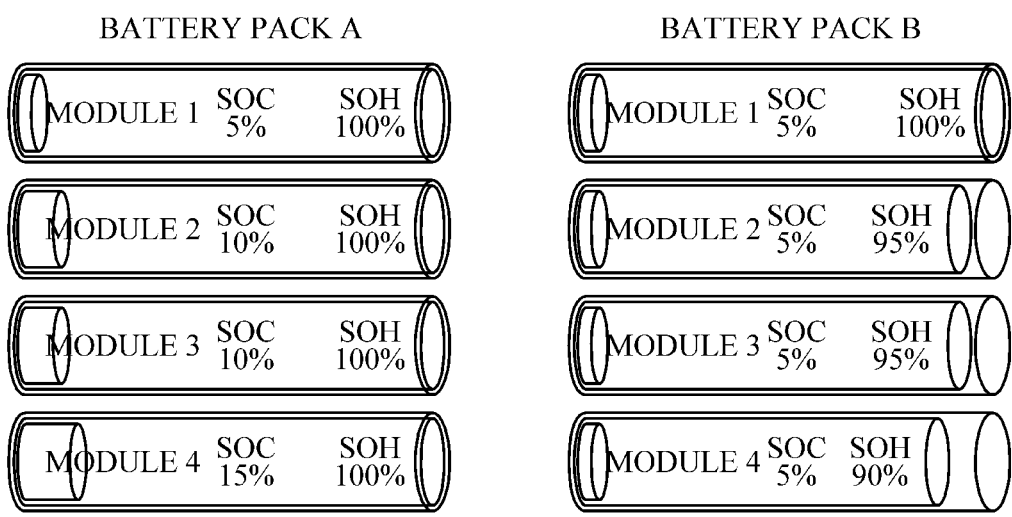
FIG. 2 is an example view illustrating various battery states including a state of charge (SOC) and a state of health (SOH).

FIG. 1 is a block diagram illustrating a battery pack charging apparatus according to an embodiment. FIG. 2 is an example view illustrating battery packs including a battery module having various states of charge (SOC) and states of health (SOH). In addition, FIGS. 3A to 3D are example views for describing sequential battery charging, and FIG. 4 is a graph illustrating a maximum pulse current based on an SOC, according to an aspect.

According to an embodiment, a battery pack charging apparatus 100 is configured to support sequential pulse charging of a battery to enable pulse charging while minimizing peak power in a battery, for example, a large capacity EV battery. Here, the battery pack includes, for example, a plurality of battery modules connected in serial and/or in parallel manner. In addition, each of the battery modules may include a plurality of individual battery cells. Here, each of the battery modules or the battery cells may be a secondary battery including a nickel metal battery, a lithium ion battery, lithium polymer, or other suitable battery. In addition, capacities of the battery modules may be equal to each other or may be different from each other. The interconnection between battery pack/module/cells, according to one or more embodiments, is reconfigurable to allow selective serial and parallel connections based on load, duration, application, and other pertinent operational parameters.

Referring to FIG. 1, the battery pack charging apparatus 100 includes a charging factor setter 110, a sequential charger 120 and a charging controller 130.

The charging factor setter 110 sets a charging factor of a battery pack based on battery information.

For example, the charging factor setter 110 sets a charging factor for sequential charging of the battery pack based on battery information continually collected in a charging/discharging process of the battery, for example, sensing data including a time, a voltage V, a current I and a temperature information T, and expectation data including SOC, SOH, overpotential, ion concentration distribution, and temperature inside the battery. Such sensing data and expectation data may indicate an absolute level, a relative amount, or delta change thereof. For example, a charging factor set for charging the battery pack includes any one or any two or more of a magnitude of a pulse current, pulse current maintaining duration and a pulse period. In addition, the charging factor is classified as a pulse charging factor and a sequential pulse charging factor.

The pulse charging factor means, for example, a magnitude of the pulse current for pulse charging. For example, the charging factor setter 110 sets a magnitude of a pulse current within a range that does not exceed a maximum pulse current according to the SOC shown in FIG. 4 using SOC information of the battery pack that is to be charged. In addition, according to one or more embodiments, a sequential pulse charging factor includes a pulse current maintaining duration for sequential pulse charging or a pulse period of the pulse in which a duration of maintaining a pause period of the pulse after application of the pulse current is set as a pulse-pause duration. The charging factor setter 110, according to an embodiment, sets a pulse period according to the number of standard units of the sequential charging.

The charging factor setter 110 can set charging factors according to charging groups of the battery pack that are set for sequential charging. In addition, the charging factor setter 110 determines the sequential pulse charging factors according to the number of charging groups. Here, the charging group is a standard unit in which charging is sequentially performed, and the battery modules or the battery cells of the battery pack are set as a unit. For example, each battery module is set as one charging group or two or more battery modules are set as one charging group. In addition, as needed, two or more battery cells may be set as one charging group.

For example, when the battery pack is set as four charging groups, the charging factor setter 110 can determine a duration 4t in which a pulse current of a duration t is applied and having a pause duration for a duration 3t as a sequential pulse charging factor and set a pulse charging factor within a range that does not exceed a maximum pulse current according to each SOC using SOC information of each of the charging groups. The charging factors are set, according to one or more embodiments, to be equal or different according to battery information such as SOC and/or SOH of each of the charging groups.

For example, referring to FIGS. 1 and 2, while battery modules 1, 2, 3 and 4 of a battery pack A have the same SOH, the battery module 1, the battery modules 2 and 3, and the battery module 4 have different SOCs. When the battery modules of the battery pack are set to one charging group, the charging factor setter 110 sets, for example, discriminative charging factors according to the charging groups by considering different SOCs of the charging groups.

The sequential charger 120 sequentially charges the charging groups based on the charging factors defined by the charging factor setter 110.

Figure 3A:
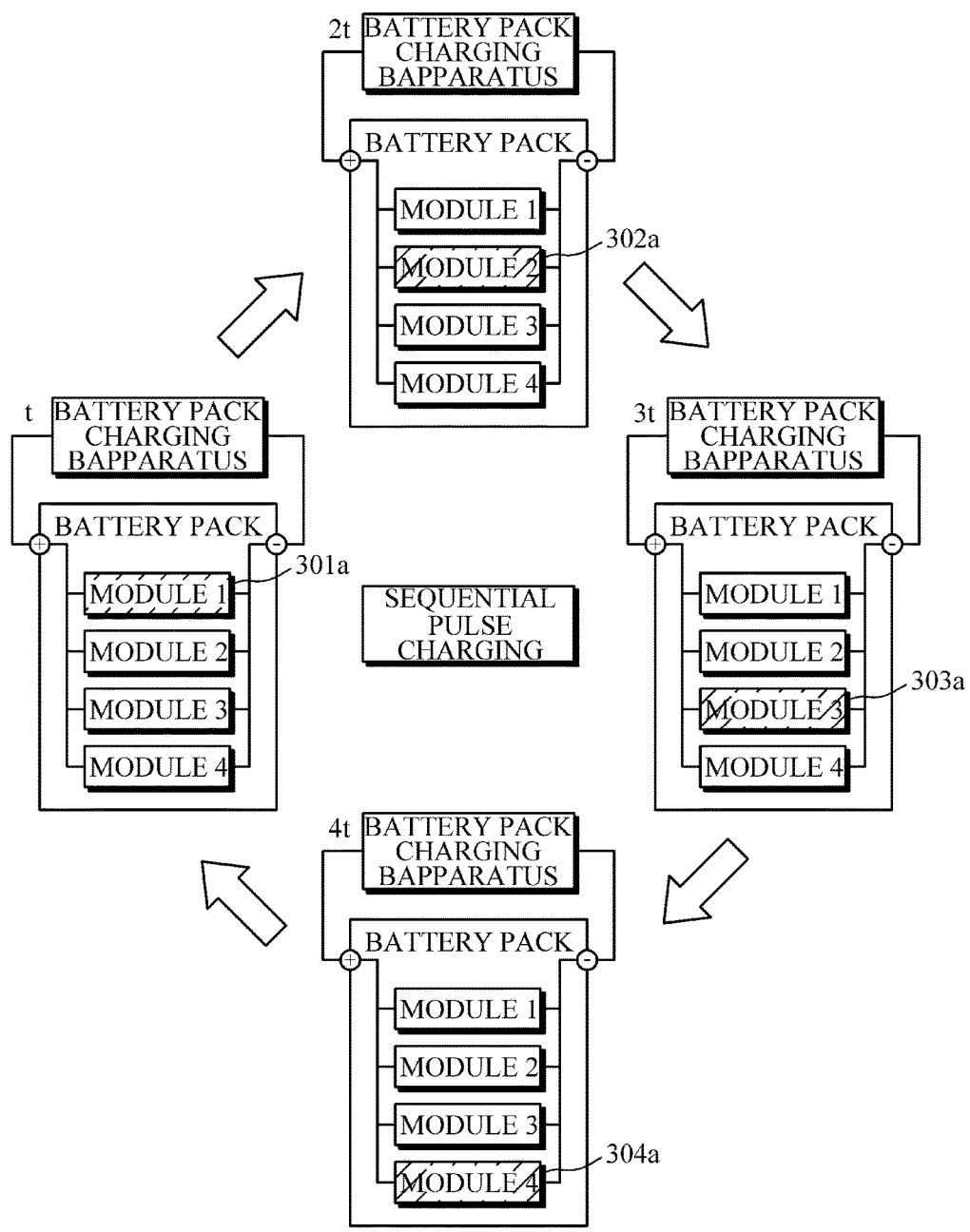
FIGS. 3A to 3D are example views for describing sequential battery charging.
Figure 4:
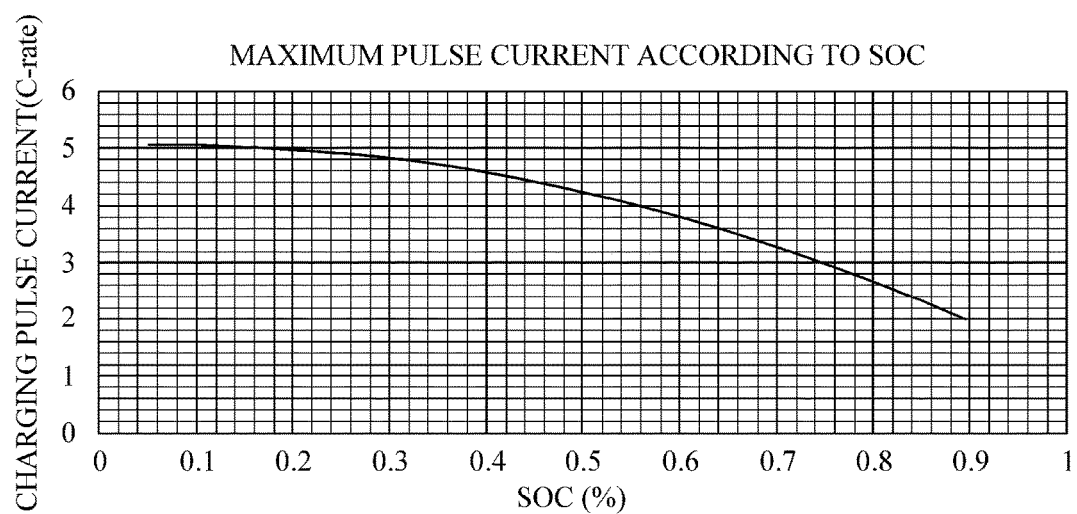
FIG. 4 is a graph illustrating an example of a substantially maximum pulse current according to the SOC.

FIG. 3A is an example view for the convenience of understanding of sequential pulse charging of a module. Referring to FIGS. 1 and 3A, the sequential charger 120 can sequentially apply the pulse current to the charging groups according to the charging factors of the set groups for sequentially charging the battery packs. Here, the sequential charger 120 applies the pulse current of the next charging group during a pause duration of the previous charging group to sequentially charge the charging groups when application of the pulse current to the previous charging group is terminated to enter into the pause duration.

For example, FIG. 3A exemplifies that the battery modules of the battery pack are set to charging groups, and the battery modules 1, 2, 3 and 4 constitute charging groups 1, 2, 3 and 4, respectively.

The sequential charger 120 applies the pulse current determined by the charging factor setter 110 for a duration t, and when the sequential pulse charging factor of the pulse period 4t (having a pause duration for a duration 3t is determined), each of the charging groups performs the charging for a duration t and includes a pause duration for ion diffusion for a duration 3t. For example, when the pulse current is applied to the charging group 1 (301a) to perform the charging for duration t, the sequential charger 120 applies the pulse current to the charging group 2 (302a) to perform the charging for a duration starting at 2t, and apply the pulse current to the charging group 3 (303a) to sequentially perform the pulse charging to the charging group 4 (304a) for a duration starting at 3t. Here, the sequential charger 120 performs the charging of the next charging group for the pause duration of the previous charging group to sequentially charge the charging group 1 (301a), the charging group 2 (302a), the charging group 3 (303a) and the charging group 4 (304a) for a total pulse period 4t.

According to one or more embodiments, the sequential charging based on the charging groups include a switch or a bypass circuit configured to individually and selectively control the battery modules and/or battery cells of the battery pack, the sequential charging is not limited thereto and may include a digital circuit configured to control charging/discharging of the charging groups.

In addition, while FIG. 3A shows a method of sequentially charging the charging groups connected in parallel for the convenience of description, the charging groups are not limited thereto and the battery modules and the battery cells of the battery pack may have a serial structure, parallel structure, reconfigurable interconnects, or a complex combinational structure of serial and parallel arrangements.

Meanwhile, while FIG. 3A exemplifies that one charging group is set to one battery module unit, the charging group is not limited thereto and the charging group may be constituted by a plurality of battery cells and/or the battery modules based on battery pack information, for example, SOC. For example, referring to FIG. 2, while the battery modules 1, 2, 3 and 4 of the battery pack A have the same SOH, the battery module 1, the battery modules 2 and 3, and the battery module 4 have different SOCs. Because, for example, the modules 2 and 3 have the same SOC, the modules 2 and 3 are established to constitute one charging group.

Here, the charging factor setter 110 determines magnitudes of the pulse current and maintaining durations of the pulse current in consideration of different SOCs of the charging groups. For example, the charging factor setter 110 determines the charging group 1 (the module 1) to a pulse current of 4 A (amperes), the group 2 (the modules 2 and 3) to a pulse current of 3.5 A and the group 4 (the module 4) to a pulse current of 3 A, and initially sets pulse maintaining durations of the charging groups 1-3 to one second. The charging factor setter 110 sets discriminative charging factors adaptively according to SOCs of the charging groups within a range that does not exceed the maximum pulse current according to SOCs shown in FIG. 4.

Referring back to FIG. 1, the charging controller 130 determines whether the charging group reaches the charging condition while the charging groups of the battery pack are sequentially charged. The charging condition may be full charging of the battery pack, constant duration charging of the battery pack, constant capacity charging of the battery pack, and so on but not limited thereto.

For example, the full charging condition of the battery pack means, for example, that charging is performed until the SOC of a standard unit of each charging group is 100%, the constant duration charging of the battery pack means that the battery pack is connected to the battery pack charging apparatus to perform charging, for example, for 30 minutes, and the constant capacity charging of the battery pack means that charging of power supplied from the battery pack charging apparatus is limited to, for example, 50 kW.

As another example, when the charging condition is the full charging of the battery pack, while the charging controller 130 determines whether each of the charging groups of the connected battery pack reaches the charging condition to stop the charging of the charging group of which charging is completed or terminate the sequential charging of the sequential charger 120, it is not limited thereto but the sequential charger 120 may adaptively and dynamically adjust the charging groups such that the charging groups reach substantially the same charging condition through group liaison control and coordination.

Figure 3B:
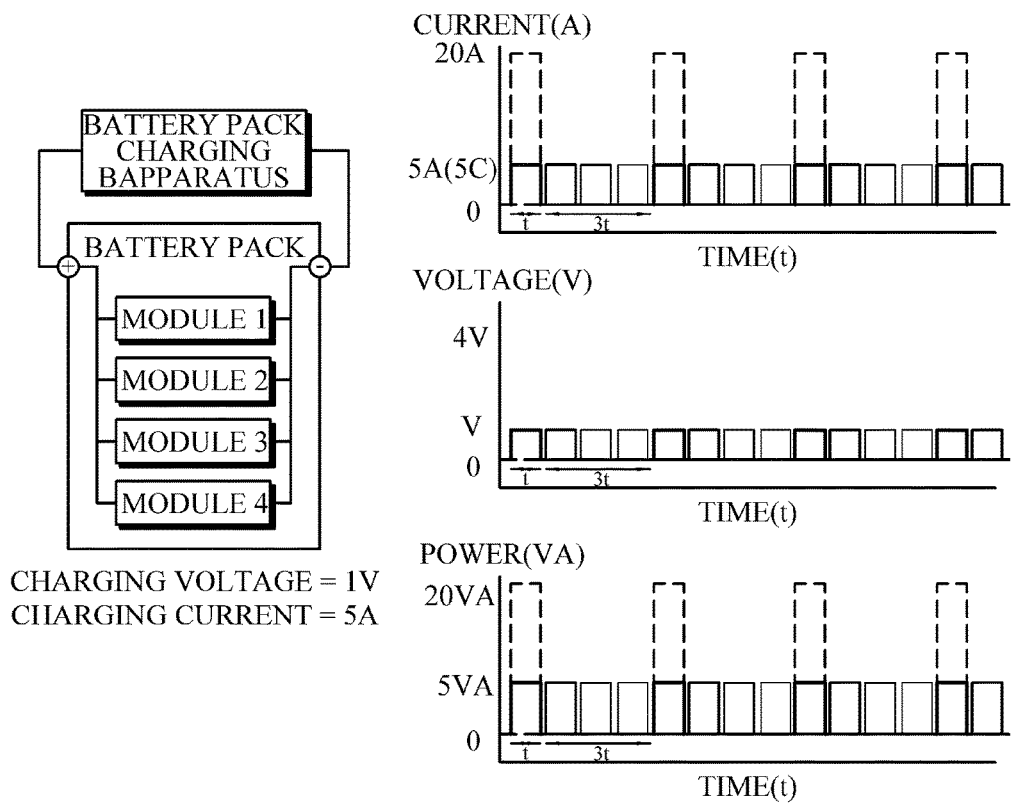

As still another example, when the charging condition is the constant duration charging of the battery pack, after the constant duration charging of the battery pack is finished, the charging controller 130 adjusts the charging factors such that deviation in a charged state of each of the charging groups of the battery pack is minimized through the group liaison control based on the charging capacity of the battery pack charging apparatus 100 and battery information of the charging groups of the battery pack connected to the battery pack charging apparatus 100. Variations of the SOCs according to the charging duration in which the sequential pulse charging is performed to minimize the deviation of the charging state according to the charging groups of the battery pack upon reaching the charging condition by adjusting the charging factors according to the embodiment are shown in FIG. 3D.

The charging controller 130 compares individual group control factors (alternatively referred to as "group control factors" or "set group control factors") with a preset critical value and adjusts the charging factors of the charging groups based on the compared result when the charging groups do not reach the charging condition and the sequential charging is continued. Here, the individual group control factors, according to one or more embodiments, include at least one of each of the charging groups of the battery pack or a voltage, overpotential, ion concentration distribution, a temperature of individual battery cells and/or modules included in each of the charging groups but not limited thereto.

For example, the charging controller 130 adjusts the charging factors of the corresponding charging group according to a predefined reference when the voltage of the charging group exceeds the preset critical value using a monitoring result of a specified charging group. However, the charging controller 130 is not limited as such, and when the specified charging group is constituted by a plurality of battery cells and/or battery modules, the charging controller 130 also differently applies the pulse currents according to the battery cells and/or the battery modules in the charging group when the voltage deviation between the battery cells and/or the battery modules in the specified charging group exceeds the preset critical value. For example, the charging controller 130 adjusts the pulse current of the corresponding charging group to be decreased by 0.5 C (C-rate) when the voltage of the individual battery cell of a charging group exceeds 4.2 V and adjusts the pulse current of the corresponding charging group to be decreased by 0.3 C (C-rate) when a negative electrode overpotential reaches 0.01 V. However, the charging controller 130 is not limited, as such, and the charging may be temporarily stopped by excluding the corresponding battery cell from a sequential charging process of the corresponding charging group.

Here, while the critical value may be a voltage, overpotential, temperature, or the like corresponding to the safety range of the individual battery cell, the critical value is not limited thereto and may be varied according to the SOC, the SOH and a magnitude of the present pulse current, and a user or an operator may adjust the critical value in consideration of a charging capacity of the individual battery cell or performance of the battery pack charging apparatus, for example, a maximum allowable peak power or the like.

In addition, the charging controller 130 is configured to compare the pack control factor with the preset critical value when the charging group does not reach the charging condition and the charging is continued, and adjusts the charging factors of the charging groups showing a maximum or minimum value of the corresponding pack control factor according to the predefined reference when the pack control factor exceeds the preset critical value. Here, while the pack control factor may include each of the charging groups or at least one of temperature deviation, SOC deviation and SOH deviation of the individual battery cell and/or module included in each of the charging groups, the pack control factor is not limited thereto and the deviation of the individual group control factor may be used as the pack control factor.

For example, the charging controller 130 adjusts the current of the charging group having a maximum SOC value to be decreased by 0.3 C (C-rate) when an average SOC of each of the charging groups is 50% or more and the SOC deviation between the charging groups is larger than 10% and adjust the pulse current of the charging group having a maximum temperature among comparison targets to be decreased by 0.5 C (C-rate) when a temperature deviation between the charging groups is 10 degrees or more, to reduce the SOC and the temperature deviation. In addition, the charging controller 130 is not limited to adjusting the charging factor of the charging group and may temporarily stop the charging of the corresponding charging group.

Here, while adjustment of the charging factor through the pack control factor may be performed when an individual group control factor of each of the charging group does not exceed the preset critical value, the adjustment is not limited thereto and may be performed in parallel with charging factor adjustment by an individual group control factor.

The charging controller 130 adjusts the charging factor by adjusting the charging factor with a preset critical value such that the charging factor of each of the charging groups is included in the safety range when the charging factor is adjusted based on the individual group control factor and/or the pack control factor.

For example, the charging controller 130 compares the adjusted pulse maintaining duration among the adjusted charging factors with a preset minimum maintaining duration and initializes the pulse maintaining duration to an initial value based on the compared result. For example, when the adjusted pulse maintaining duration among the charging factors of some of the charging groups is set to be smaller (for example, 0.1 second) than a preset minimum maintaining duration (for example, 0.5 seconds), the pulse maintaining duration is initialized to an initial value (for example, 1 second) set by the charging factor setter 110. As described above, the charging controller 130 controls the battery pack charging apparatus 100 to be operated within the safety range by initializing the corresponding charging factor to an initial value within the preset safety range when the charging factors of the charging groups deviate from the safety range.

When at least one of the charging factors is initialized, the charging controller 130 adjusts another charging factor in relation to the initialized factor. For example, when the pulse maintaining duration is set to be smaller than the preset minimum maintaining duration and the pulse maintaining duration is initialized, the charging controller 130 adjusts the pulse current magnitude of each of the charging groups to a common current magnitude. Here, the common current magnitude means, for example, a current magnitude that is commonly and synthetically applied to the charging groups. In addition, the common current magnitude is adjusted based on the ratio of reaching the charging condition of each of the charging groups as described above.

In addition, the charging controller 130 adjusts the charging factor based on the maximum pulse current according to the SOC when the charging factor is adjusted.

Referring to FIGS. 1 and 4, the maximum charging pulse current is gradually reduced as the SOC of the battery is increased. Here, the charging controller 130 adjusts the magnitude of the pulse current of the charging group based on the SOC value of the battery varied according to the sequential charging of the sequential charger 120 and the magnitude of the pulse current of the charging group based on the maximum pulse current according to the SOC. For example, when the SOC of the charging group during the sequential charging with the pulse current of 4 C (C-rate) exceeds 56%, the charging controller 130 adjusts the magnitude of the pulse current of the corresponding charging group to 3 C (C-rate) in consideration of the magnitude of the maximum pulse current according to the SOC of FIG. 4.

In addition, referring to FIG. 4, the SOC having the pulse current of 3 C (C-rate) as the maximum pulse current is about 74%, and the charging controller 130 adjusts the magnitude of the pulse current again in consideration of the maximum pulse current according to the SOC when the SOC of the corresponding charging group reaches 74% during the sequential charging.

Meanwhile, the charging controller 130 determines whether the group liaison control is performed based on the charging condition when the charging factor is adjusted based on the individual group control factor or the pack control factor and battery information of the charging groups. Here, in the group liaison control, when the charging factor of the charging group is adjusted, the charging factors of different charging groups may be liaison-controlled together according to a ratio of the charging condition reached for each of the charging groups of the battery pack.

For example, when the adjusted charging factor of the charging group is set to be deviated from the safety range and the corresponding charging factor is initialized, the charging controller 130 controls the battery pack charging apparatus 100 in relation to a charging factor of another charging group according to the ratio of reaching the charging factor of the charging group.

Figure 3C:
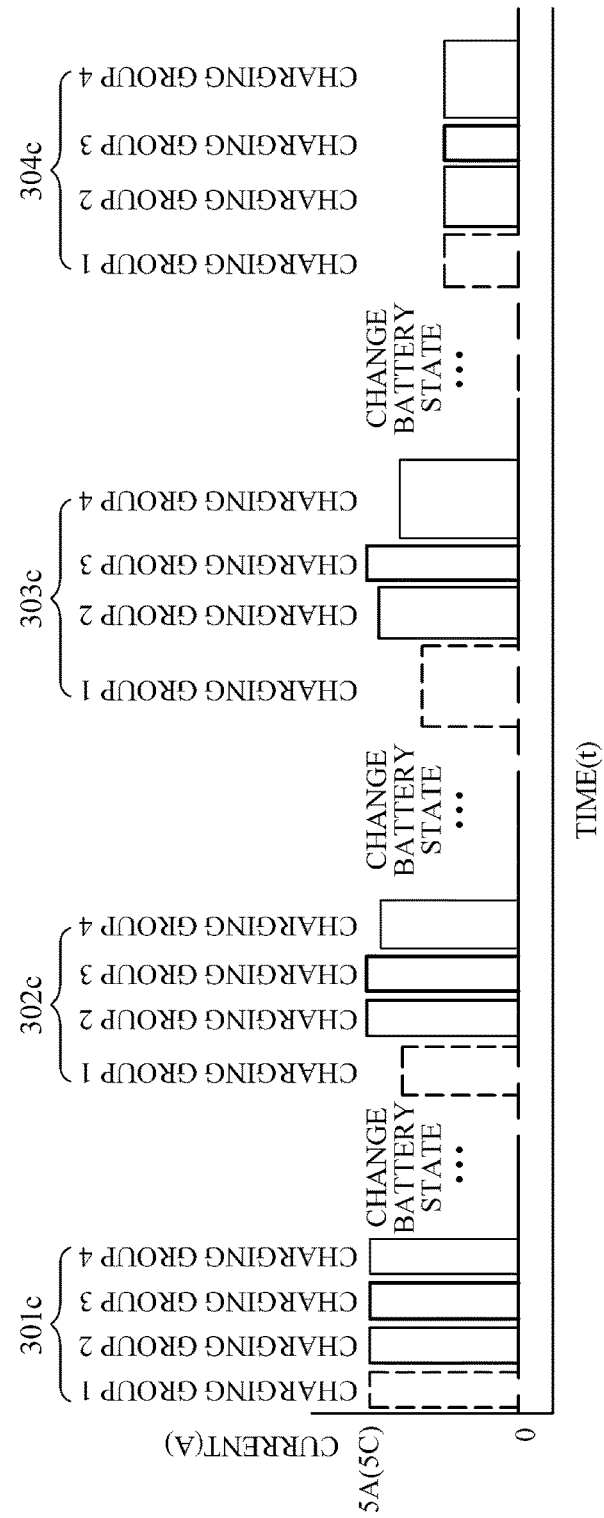
Figure 3D:
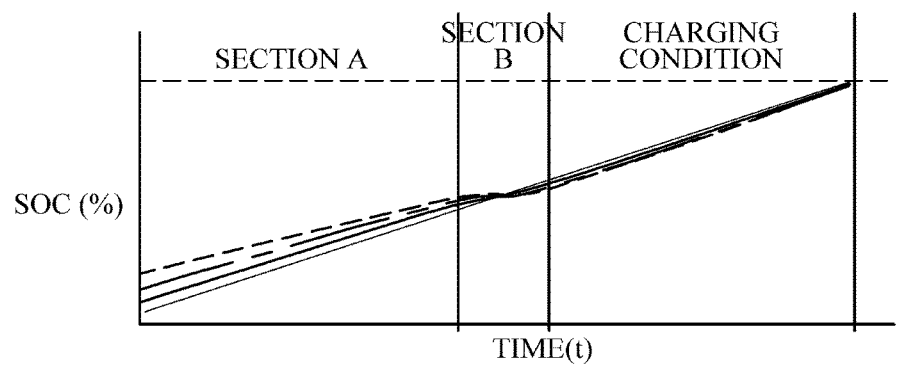

For example, referring to FIGS. 1 and 3c, reference character 304c shows a state in which the pulse current magnitudes of the charging groups 1 to 4 are adjusted to the common pulse current and the pulse maintaining duration is adjusted according to the ratio of reaching the charging condition of each of the charging groups. The charging controller 130 can initialize the pulse maintaining duration to the initial value (for example, 1 second) set by the charging factor setter 110 when the adjusted pulse maintaining duration among the charging factors of the charging groups is set to be smaller (for example, 0.1 second) than the preset minimum maintaining duration (for example, 0.5 seconds). Here, the charging controller 130 is configured to adaptively adjust the pulse current magnitudes of the charging groups to the common pulse current magnitude (for example, 2.5 A) while initializing the pulse maintaining duration.

Meanwhile, the charging controller 130 adjusts the pulse maintaining duration of each of the charging group based on the adjusted common pulse magnitude and the ratio of reaching the charging condition of each of the charging groups.

The charging controller 130 performs the group liaison control of the charging groups based on the charging conditions and the battery information of the charging groups.

For example, when the charging condition is full charging, the charging controller 130 can charge the battery pack except for the charging group which was fully charged from the sequential charging without performing the group liaison control. However, the charging controller 130 is not limited as such and the sequential charging through the group liaison control can be performed according to a user's or an operator's intention. For example, the charging controller 130 employs a liaison-control of the charging groups when an average charging rate of the battery pack is 50% or more and may perform the charging through the group liaison control of the charging factors according to a capacity to be charged of each of the charging groups or a ratio of the SOC.

In addition, when the charging condition is the constant capacity charging, the charging controller 130 is operable to liaison-control the charging groups and to perform the group liaison control of the charging factor at a ratio of charging amounts according to the charging groups at the timing of liaison control of a certain charging group. Specifically, charging capacities are allotted to the charging groups according to the battery state (for example, SOC and/or SOH) of the charging groups before charging start of the battery pack, and the charging factors, according to one or more embodiments, are liaison-controlled with reference to the allotted charging capacities.

For example, when 55 kW is supplied from the battery pack charging apparatus to charge the battery pack constituted by charging groups A, B, C and D, the battery pack charging apparatus 100 adaptively allots and charges charging amounts of 10 kW, 10 kW, 15 kW and 20 kW of the charging groups according to a state of an initial charging group. Then, in the case in which 50% of the charging capacity is charged and the charging controller 130 adjusts the charging factor such that the magnitude of the pulse current of the charging group A is adjusted to 10 A when the allotted charging amounts of the charging groups are 5 kW, 5 kW, 7.5 kW and 10 kW, the charging controller 130 adjusts the magnitudes of the pulse currents of the charging groups according to ratios of the charging capacities of different charging groups. In other words, because ratios of the charging amounts of the charging groups are A:B:C:D=5 kW:5 kW:7.5 kW:10 kW=1:1:1.5:2, when the magnitude of the pulse current of the charging group A is adjusted to 10 A, the charging controller 130 controls the magnitudes of the pulse currents of the charging groups B, C and D to 10 A, 15 A and 20 A through the group liaison control.

In addition, when the magnitude of the pulse current is adjusted through the group liaison control, the charging controller 130 adjusts the charging groups having the magnitudes of the pulse currents larger than the maximum pulse current according to the SOCs of the charging groups to a value of the maximum pulse current corresponding to the SOC of the corresponding charging group in consideration of the magnitude of the maximum pulse current of the SOC shown in FIG. 4.

Meanwhile, the charging controller 130, according to one or more embodiments, performs the charging of the battery pack by designating a charging duration. For example, the charging controller 130 charges the charging groups through the group liaison control after consumption of 50% of the designated charging duration, and at such time, provided that the group liaison control is full charging, a ratio of the remaining charging capacity of each of the charging groups is calculated with reference to the full charging capacity or an imaginary chargeable capacity is calculated based on the designated duration, and the group liaison control is performed based on the calculated result. When the ratio of the remaining charging capacity or the imaginary chargeable capacity is calculated, the sequential charging can be performed through the group liaison control similarly as when the charging condition as described above is the constant capacity charging.

Referring to FIGS. 1 and 3D, when the group liaison control of each of the charging groups is performed according to the charging conditions is determined, in one or more embodiments, immediately after the battery pack is connected to the battery pack charging apparatus 100, the battery pack charging apparatus 100 determines an initial charging factor according to the SOC values of the charging groups to perform the charging and, then, applies an individual charging factor during a charging process to sequentially charge the battery pack. Next, when the SOCs of the charging groups of the battery pack reach a certain level as the charging is performed, the charging controller 130 liaison-adjusts the magnitudes of the pulse currents of the charging groups to determine whether the liaison control is performed such that the charging groups simultaneously reach the charging condition.

When the liaison control of the charging groups is determined, the charging controller 130 liaison-adjusts the charging factors of the charging groups according to a ratio reaching the charging condition (or a capacity ratio to be charged) of another charging group when a charging factor of a specified group is adjusted through an individual group control factor or a pack control factor. As described above, the battery pack charging apparatus 100 is controlled such that deviation of a charging state (for example, an SOC ratio or the like) between the charging groups can be gradually reduced through the group liaison control in which a charging factor of another charging group is adjusted while adjusting the charging factor of the specified group.

Referring to FIGS. 1 and 4, when the charging groups are liaison-controlled, the charging controller 130 adjusts the pulse current of the specified charging group, obtains a maximum pulse current value corresponding to the SOC of the other charging group according to each of the charging groups upon adjustment and sets the magnitude of the adjusted pulse current to a maximum current value according to the SOC of the charging group when the magnitude of the adjusted pulse current is larger than the magnitude of the maximum pulse current according to the SOC.

However, the charging controller 130 is not limited as such and the charging controller 130 may also precisely control the charging groups such that the deviation of the charging state (for example, an SOC ratio or the like) between the individual battery cells and/or modules included in the charging group is gradually reduced.

For example, when the charging factor is adjusted according to the individual group control factor, specifically, when a voltage of the individual battery cell included in any one charging group exceeds about 4.2 V, the pulse current is adjusted to be decreased to about a 0.5 C (C-rate), the pulse current of the corresponding individual battery cell can be adjusted and the pulse currents of the remaining battery cells of the corresponding charging group are liaison-adjusted. That is, when the pulse current of the individual battery cell of a certain charging group is adjusted, pulse currents of the remaining cells can be adjusted based on a ΔSOC ratio of the remaining individual battery cells to be charged with reference to the SOC value using the magnitude of the pulse current as a current limit when the magnitude of the pulse current of the corresponding individual battery cell is used as a reference.

For example, referring to FIG. 4, provided that a certain charging group is constituted by battery cells A, B, C and D and the present SOCs thereof are 20%, 26%, 46% and 56%, when a temperature of the battery cell A exceeds a preset critical value so that the magnitude of the pulse current is adjusted to 3.5 C (C-rate) during charging of the individual battery cell A having the SOC of 20% to 4 C (C-rate), the SOC value using the adjusted pulse current of 3.5 C as the maximum pulse current corresponds to about 66%. Here, differences (ΔSOC) between the SOC values of the other battery cells B, C and D and the SOC values compared with the SOCs using the magnitude of the adjusted pulse current of the battery cell A as the maximum pulse current are 40%, 20% and 10%, respectively.

The charging controller 130 adjusts the pulse current by setting the pulse current of the individual battery cell B to 3.5 C (C-rate) or a similar level based on the ΔSOC, setting the pulse current of the individual battery cell C to a value of less than 3.5 C (C-rate), and setting the pulse current of the individual battery cell D to a minimum pulse current within a maximum pulse current range according to the SOC or stopping the charging until the SOC of another battery cell reaches a certain range. The battery pack charging apparatus 100 is configured for control such that charging condition is achieved by minimizing the SOC deviation according to the individual battery cells through the group liaison control based on the ratio of the ΔSOC that is to be charged with reference to the adjusted current of the individual battery cell.

Referring to FIGS. 1 and 3D, a section B of FIG. 3D exemplifies SOC variations of the charging groups according to duration when the charging groups are liaison-controlled. The charging controller 130 improves lifetime of the battery pack by reducing a deviation of the charging group of the battery pack or the SOC and/or SOH of the standard unit of the charging group under a predetermined charging condition through the group liaison control of the charging factors of the charging group of the battery pack, and even when the battery pack is constituted by batteries having different capacities, the batteries uniformly reach the charging condition.

Figure 5:
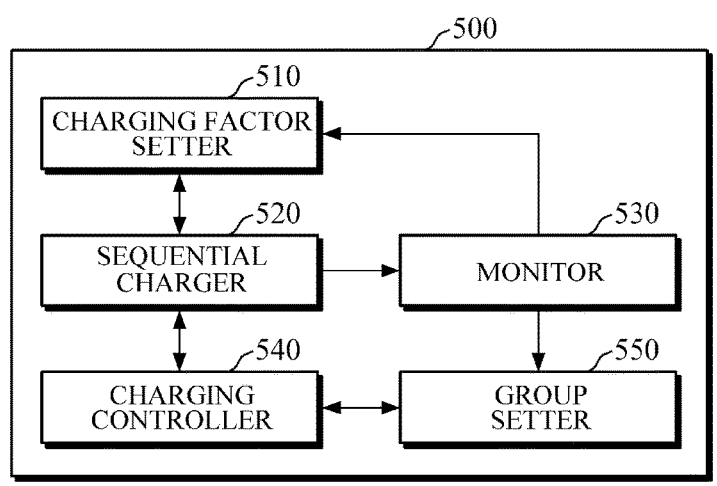
FIG. 5 is a block diagram illustrating a battery pack charging apparatus according to an embodiment.

FIG. 5 is a block diagram of a battery pack charging apparatus according to another embodiment.

Referring to FIG. 5, a battery pack charging apparatus 500 includes a charging factor setter 510, a sequential charger 520, a monitor 530, a charging controller 540 and a group setter 550. Here, the charging factor setter 510, the sequential charger 520 and the charging controller 540 have the same or similar configuration as the charging factor setter 110, the sequential charger 120 and the charging controller 130 shown in FIG. 1, and hereinafter, the apparatus will be described with focusing on the non-overlapping configuration for clarity and conciseness.

Referring to FIG. 5, the monitor 530 is configured to monitor a charging state during charging of a charging group and collect battery information in at least one of units of a battery cell, a battery module and a charging group. Here, the battery information may be sensing data including a voltage V, a current I and temperature information T and expectation data including SOC, SOH, overpotential, ion concentration distribution and temperature inside the battery, but is not limited thereto.

According to the aspect, when the battery pack is connected to the battery pack charging apparatus 500, the monitor 530 collects battery information of the battery pack connected before the charging and provide the battery information to a charging factor setter 510. Here, the charging factor setter 510 sets a sequential pulse charging factor and an initial pulse charging factor based on the information of the battery pack collected before the charging of the connected battery pack. In addition, the charging factor setter 510 can initially set the charging factor on the assumption that the individual battery cells or battery modules of the connected battery pack have the same performance even when no initial battery pack information is provided by the monitor 530.

Meanwhile, the group setter 550 is configured to set the charging group in which at least one of the battery cells or the battery modules of the battery pack is provided as a standard unit using the battery pack information collected by the monitor 530.

For example, the connected battery pack is constituted by a plurality of battery modules each including a plurality of battery cells. The group setter 550 sets the charging group of the module unit by setting a battery module including a plurality of battery cells as one group. In addition, the group setter 550 sets the charging group of the battery cell unit by grouping the plurality of battery cells in one battery module based on the battery cells having similar SOC values according to a certain reference, for example, the SOC values. However, the charging group is not limited thereto, and the group setter 550 may set the charging group of a cell-module unit of the individual battery cell and the individual battery module having similar battery information based on information of the battery pack collected by the monitor 530.

For example, provided that the battery pack includes the battery modules A and B, each module includes battery cells A1, A2, A3 and A4 and B1, B2, B3 and B4, SOC values of the battery cells A1, A2 and A3 are 10%, 20% and 30%, respectively, and SOC values of the battery cell A4 and the battery module B are 50%, the group setter 550 sets the individual battery cells A1, A2 and A3 as a charging group 1, a charging group 2 and a charging group 3, respectively, and sets the battery cell A4 and the battery module B as a charging group 4.

The group setter 550 sets the charging group based on at least one of performance of the battery cell, the battery module, and a maximum allowable peak power and SOH of the battery pack charging apparatus.

For example, when the battery pack is connected to the battery pack charging apparatus 500, the group setter 550 can set the connected battery packs into at least one charging group on the assumption that the individual battery modules or the individual battery cells of the battery pack have the same performance. Here, the group setter 550 is configured to classify the battery pack into, for example, four or five charging groups in consideration of a pulse-pause duration of the sequential pulse charging.

In addition, the group setter 550 determines, as the number of groups, a round-off value of a value obtained by dividing the maximum pulse power for charging the battery pack by a maximum allowable peak power of the battery pack charging apparatus using the maximum allowable peak power of the battery pack charging apparatus obtained from the battery pack charging apparatus.

For example, when the maximum allowable peak power of the battery pack charging apparatus is 1 VA, the maximum pulse current for charging the battery pack is 5 A and the charging voltage is 1 V, the maximum pulse power for charging the battery pack is 5 VA. Here, a value obtained by dividing the maximum pulse power for charging the battery pack by the maximum allowable peak power of the battery pack charging apparatus is 5 VA/1 VA=5, and the group setter 550 sets, for example, five charging groups using at least one of the battery cells or the battery modules of the battery pack as a standard unit.

The battery sequential pulse charging by the above-mentioned group setting significantly reduces the maximum allowable peak power of the battery pack charging apparatus 500, and thus, heat generation of the battery pack charging apparatus 500 is reduced.

For example, referring to FIG. 3B, four battery modules having the same internal resistance are connected to the battery pack for pulse charging in parallel, a peak power required for the battery pack charging apparatus is 20 VA when the pulse current and the charging voltage upon pulse charging of the battery pack are 20 A and 1 V, and here, charging power of each of the battery modules is 5 VA per each of the battery modules. On the other hand, when the modules of the battery pack are set as one charging group and the sequential charging is performed according to the charging groups to supply the charging power of 5 VA to each of the battery modules in the same manner as described above, the pulse current and voltage required for the charging groups are 5 A and 1 V, respectively. As a result, required performance of the maximum allowable peak power of the battery pack charging apparatus is reduced from 20 VA to 5 VA, and thus, pulse charging of the battery pack having a large capacity of an EV or the like using the battery pack charging apparatus 500 having a relatively low capacity becomes possible.

In addition, the group setter 550, according to one or more embodiments, sets the groups according to the individual battery cells or modules having a similar SOH of the battery based on the SOH of the battery. For example, referring to FIG. 2, while the battery modules 1, 2, 3 and 4 of the battery pack B have the same SOC, the battery module 1, the battery modules 2 and 3 and the battery module 4 may be set as different charging groups based on a ratio of different SOHs.

The group setter 550 is configured to set the charging group, initially set with reference, to at least one kind of battery information among SOC, SOH, temperature inside a battery and a chargeable capacity according to the sequential charging of the groups.

For example, referring to FIG. 2, first, the modules of battery pack A, connected to the group setter 550, have the same SOH. The group setter 550 sets the battery modules to different charging groups 1 to 4 based on the SOH information. Then, when variations in SOHs of the charging groups occur according to the sequential charging of the charging groups, for example, when the SOHs of the charging groups 1 to 4 are varied to 95%, 95%, 100% and 90%, respectively, the group setter 550 adjusts the initially set charging groups such that the charging groups 1 and 2 are set to the charging group 1, the charging group 3 is set to the charging group 2, and the charging group 4 is set to the charging group 3. However, the group setter 550 is not limited to the embodiment and the group setter 550 adjusts the groups in consideration of the most efficient pulse-pause duration of the pulse charging.

When the charging groups are adjusted, the charging controller 540 adaptively adjusts the charging factors corresponding to the adjusted groups. For example, referring to FIG. 3C, when the battery states of the charging groups are varied according to the sequential charging of the charging groups, the adjusted charging groups are adjusted to have different charging factors, for example, different pulse current magnitudes, pulse current maintaining durations and pulse period.

For example, when the charging groups 1 to 4 are set, on the assumption that the individual battery cells or the individual battery modules constituting the charging groups have the same performance (301*c*), the SOH or SOC of the charging group may vary as the sequential charging is performed, and the charging controller 540 adaptively adjusts the charging factors to the group adjusted to the individual battery cells or the individual battery modules having similar battery information based on the battery monitoring result of the monitor 530. For example, the charging group having a low SOC is adjusted to have a large pulse current or may be adjusted to have a pulse current maintaining duration larger than another charging group, and the charging group having higher SOCs than another charging group may have its pulse period adjusted such that only one pulse current is applied while the pulse current is applied to the other charging group two times (302*c*, 303*c*).

As another example, when the adjusted charging factor of the charging group is incorrectly set to deviate from the safety range, the charging controller 540 initializes the corresponding charging factor and controls a charging factor of another charging group according to the ratio of reaching the charging condition of each of the charging groups. For example, the charging controller 540 initializes the pulse maintaining duration to an initial value (for example, 1 second) set by the charging factor setter 540 when the adjusted pulse maintaining duration among the charging factors of the charging groups is set to be smaller (for example, 0.1 second) than the preset minimum maintaining duration (for example, 0.5 seconds). Here, the charging controller 540 controls the pulse current magnitudes of the charging groups together with initialization of the pulse maintaining duration through liaison control.

For example, referring to FIGS. 5 and 3*c*, the charging controller 540 adjusts the pulse current magnitudes of the charging group in which the pulse maintaining duration is initialized and the other charging groups to the common pulse current magnitude, and adjusts the pulse maintaining durations of the other charging groups based on the ratio of reaching the charging condition of each of the charging groups (304*c*). As described above, the charging controller 540 is configured to liaison-control the pulse current magnitudes of the charging groups and the pulse maintaining durations of the other charging groups upon adjustment of the charging factor such as initialization of the pulse maintaining durations of some of the charging groups.

When the charging groups are adjusted according to the battery information varying as the charging is performed and the charging factors according to the charging groups and/or standard units of the charging groups are adjusted, the sequential charger 520 performs the sequential charging according to the adjusted charging groups and charging factors.

Figure 6:
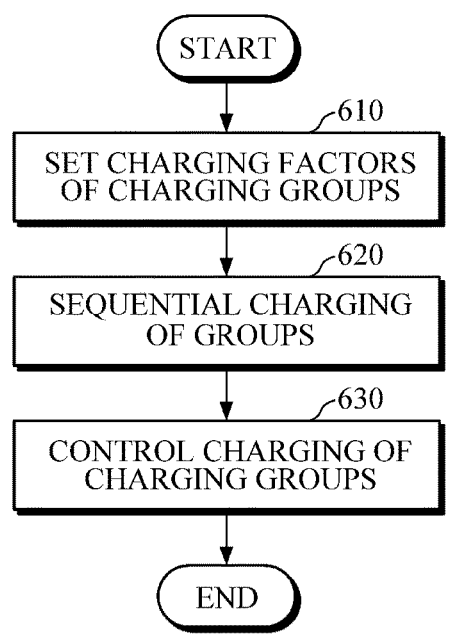
FIG. 6 is a flowchart illustrating a battery pack charging method according to an embodiment.

FIG. 6 is a flowchart illustrating a battery pack charging method according to an embodiment.

FIG. 6 is an embodiment of the battery pack charging method performed by the battery pack charging apparatus 100.

Referring to FIG. 6, the battery pack charging apparatus 100 sets the charging factors including any one or any combination of two or more of: a magnitude of the pulse current, a pulse current maintaining duration, and a pulse period according to the charging groups to perform the sequential charging (610).

For example, the battery pack charging apparatus 100 determines the pulse period in consideration of the pulse-pause duration of the most efficient sequential pulse charging on the assumption that all of the individual battery cells and the individual battery modules of the battery pack have the same performance. For example, on the assumption that the individual battery cells and the individual battery modules of the battery pack have the same performance when the sequential charging of the battery pack including four battery modules is performed, the battery modules are set to one charging group, the sequential pulse current maintaining duration is t, the pause period is 3t, the pulse period is 4t, and the charging factors according to the initial charging groups may be set to apply the same magnitude of the pulse current to the charging groups (610).

Here, on the assumption that the individual battery cells and the individual battery modules of the battery pack have substantially the same performance as described above, while the setting of the charging group determines the pulse period in consideration of the pulse-pause duration of the most efficient sequential pulse charging, setting of the charging groups is not limited as such and the charging groups may be set based on at least one of the maximum allowable peak power and the SOH of the battery pack charging apparatus (610).

For example, referring to FIG. 2, as a result of the battery information monitoring, when the battery pack connected to the battery pack charging apparatus 100 is the battery pack A, the battery pack charging apparatus 100 performs a method of setting the battery module 1 to a charging group 1, the battery modules 2 and 3 to a charging group 2 and the battery module 4 to a charging group 3 according to the SOCs of the battery modules.

When the charging factors are set, the battery pack charging apparatus 100 performs the sequential charging according to the determined charging groups (620).

Referring to FIG. 3A, the battery pack charging apparatus 100 sequentially charges the charging group by sequentially applying the pulse current to the charging groups according to the charging factors of the set groups.

For example, on the assumption that the battery pack connected to the battery pack charging apparatus 100 includes four individual battery modules and the battery modules have the same function, when the charging groups are set in a method in which the battery modules are set to one charging group, the battery module 1 is grouped as a charging group 1 (301*a*) and the battery module 2 is grouped as a charging group 2 (302*a*) and the set charging groups are sequentially charged, the pulse for the sequential charging has a period 4t, the pulse current is applied at time t, and the pause period has a duration 3t. The illustrated t, 2t, 3t, 4t indicate only the relative ordering and not the duration afforded to each charge group. In other words, t equals 4t in terms of time, according to one or more embodiments. However, in other embodiments, the duration of each charging group may be determined based on factors such as the number of cells or modules in the battery pack.

Here, the battery pack charging apparatus 100 applies the pulse current to the charging group 1 at time t, applies the pulse current to the charging group 2 at time 2t, and applies the pulse current to the charging group 3 at time 3t to sequentially charge the charging groups of the battery pack. Here, the charging group 2 (302*a*) is charged during at least a portion of the pause duration of the charging group 1 (301*a*) of the battery pack charging apparatus 100 to sequentially charge the charging group 1 (301*a*), the charging group 2 (302*a*), the charging group 3 (303*a*) and the charging group 4 (304*a*) during the pulse period 4t (620). Meanwhile, while FIG. 3A shows that the four charging groups in which the modules are set to different charging groups are sequentially charged, the number of charging groups is not limited thereto, and the number of charging groups and/or an application period of the sequential pulse current can be adjusted based on the battery information.

In addition, when the sequential charging of the battery pack is performed and the battery states of the charging groups are varied, the battery pack charging apparatus 100 charges the battery pack by determining whether the battery pack reaches the charging condition. Here, the charging condition may be full charging of the battery pack, constant duration charging of the battery pack, constant capacity charging of the battery pack, or the like but not limited thereto.

For example, when the charging condition is the full charging of the battery pack, the battery pack charging apparatus 100 charges the battery pack in a manner in which the sequential charging is performed until the charging groups are fully charged, and the charging group that is first fully charged is excluded from the sequential charging. In addition, the charging groups can be sequentially charged by the battery pack charging apparatus 100 through the group liaison control while reducing the deviation in the charging states of the charging groups. For example, when the average charging rate of the battery pack is 50% or more, the charging groups can be liaison-controlled to be charged through the group liaison control of the charging factor according to the capacity that is to be charged according to the charging group or a ratio of the SOC.

The battery pack charging apparatus 100 adjusts the charging factors based on the individual group control factors when the battery pack does not reach the charging condition and is continuously charged. Here, the individual group control factors include any one or any combination of two or more of the charging groups of the battery pack, a voltage, overpotential, ion concentration distribution and temperature of the individual battery cells and/or modules included in the charging groups but not limited thereto.

For example, the battery pack charging apparatus 100 adjusts the charging factors such that the charging group is charged within a safety range based on the individual group control factors and adjusts the charging factors of the charging groups of the battery pack or the individual battery cells and/or modules included in the charging group. For example, the individual group control factors may temporarily stop the corresponding charging group until the magnitude of the pulse current of the corresponding charging group is largely decreased by adjusting the charging factors or the temperature of the corresponding charging group is equal to or smaller than the preset critical value when the temperature of the corresponding charging group exceeds the preset critical value based on the information of the charging groups of the battery pack (630).

In addition, when the battery pack does not reach the charged condition and continues charging, the battery pack charging apparatus 100 can adjust the charging factors such that the battery pack charging apparatus 100 reduces the charging state deviation based on the pack control factors even when all of the individual group control factors of the battery pack are equal to or smaller than the critical value (630). Here, while the pack control factors may include any one or any combination of two or more of: temperature deviation, SOC deviation and SOH deviation of the charging groups of the battery pack, the pack control factors are not limited thereto and may include a deviation between temperatures, SOCs and SOHs of the individual battery cells and/or the individual battery modules included in the charging groups.

For example, even in the case in which the temperature of the charging group does not exceed the preset critical value, when a temperature deviation from another charging group is about 10 or more, the battery pack charging apparatus 100 temporarily stops (or reduces) the charging of the corresponding charging group until the magnitude of the pulse current of the charging group of the maximum temperature is reduced or the temperature deviation of the charging group different from the corresponding charging group is equal to or smaller than the preset critical value.

Next, the battery pack charging apparatus 100 adjusts the charging groups in consideration of the progressing sequential charging. For example, first, when the charging groups are set on the assumption that the individual battery cells and the individual battery modules of the battery pack have the same performance, a difference between the SOHs or the SOCs of the battery may occur as the sequential charging is performed, and at this point, the battery pack charging apparatus 100 adjusts the charging groups using the individual battery cells or the individual battery modules having similar battery information, for example, similar SOCs or SOHs, while adjusting the charging factors.

For example, referring to FIG. 2, the battery pack charging apparatus 100 sets the battery modules to different charging groups 1 to 4 based on the SOC and the pulse-pause duration of the battery pack B. While the SOH of the charging groups 1 to 4 before the charging are 100%, 95%, 95% and 90%, respectively, even when the pulse currents having the same magnitude are applied to the charging groups to perform the sequential charging, the SOCs of the charging groups may differ. For example, when the SOCs of the charging groups 1 to 4 are varied to 20%, 25%, 25% and 35%, respectively, as the charging is performed, the battery pack charging apparatus 100 adjusts the initially set charging group such that the charging groups 2 and 3 are set to a charging group 2 and the charging group 4 is set to a charging group 3.

Figure 7:
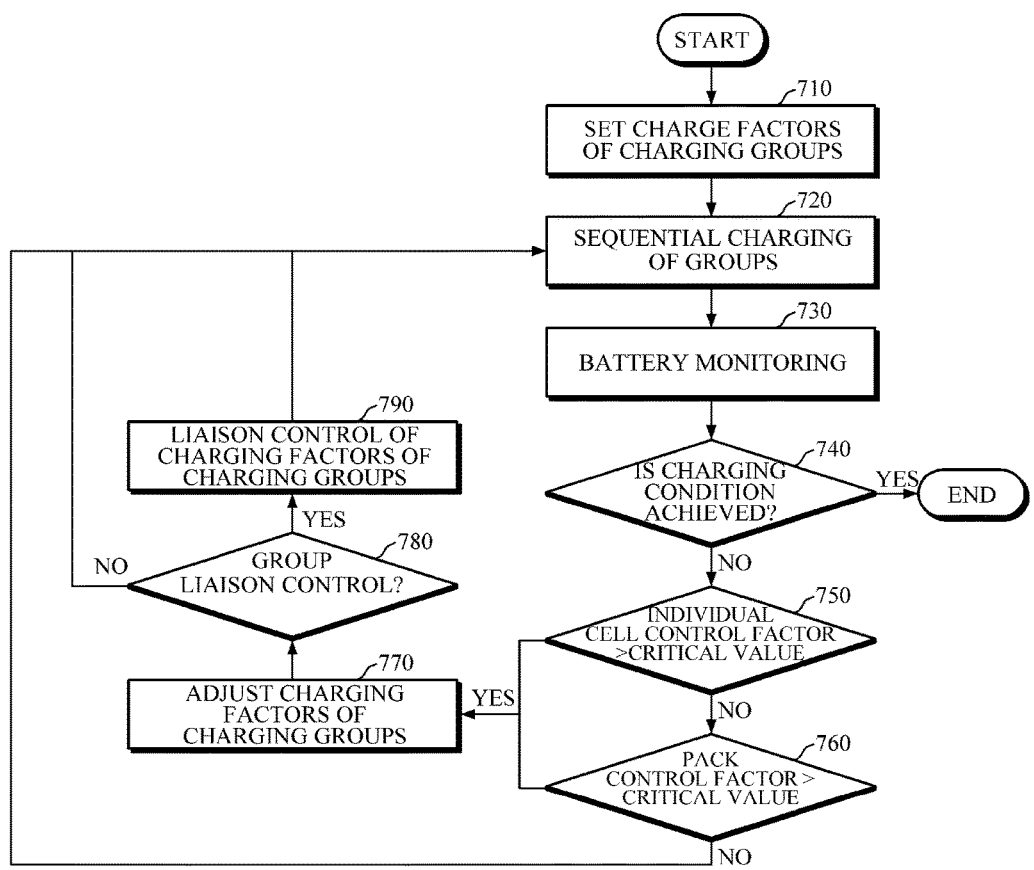
FIG. 7 is a flowchart illustrating a battery pack charging method according to an embodiment.

FIG. 7 is a flowchart illustrating a battery pack charging method according to another embodiment.

FIG. 7 is an embodiment of a battery pack charging method performed by the battery pack charging apparatus such as the battery pack charging apparatus 500 of FIG. 5.

The battery pack charging apparatus 500 sets the charging factor when the battery pack is connected thereto (710). The charging factor may include at least one of magnitudes of the pulse currents of the charging groups, a pulse current maintaining duration and a pulse period.

Next, when the charging factor is set, the battery pack charging apparatus 500 performs the sequential charging by the determined unit of the charging groups (720). While, in the sequential charging, the pulse current is sequentially applied to the charging groups according to the charging factors of the groups of the set groups and the pulse current is applied to the next charging group during the pause duration of the previous charging group to which the pulse current is applied to sequentially charge the charging groups, the sequential charging is not limited as such and the charging group may be sequentially charged in consideration of the most efficient pulse-pause duration of the sequential pulse charging (720).

The battery pack charging apparatus 500 continuously monitors and collects the battery information while performing the sequential charging (730). While the battery information may be sensing data including the voltage V, the current I and the temperature information T, and expectation data including SOC, SOH, overpotential, ion concentration distribution, and temperature inside a battery, there is no limitation.

Meanwhile, while FIG. 7 shows that the battery information is monitored during the sequential charging, the battery information is not limited thereto and may be monitored while connecting the battery pack to the battery pack charging apparatus, and, at the same time, the monitored result may be used to set the initial charging factors of the charging groups.

The battery pack charging apparatus 500 determines whether the battery pack reaches the charging condition to determine whether the sequential charging is to continue by continuously monitoring the battery information.

For example, when the charging condition of the connected battery pack is full charging, the battery pack charging apparatus 500 stops the sequential charging of the charging groups of the battery pack that are fully charged based on the monitored result of the battery information. However, the battery pack charging apparatus 500 is not limited as such, and when the capacity to be charged according to the charging groups through liaison control of the charging groups or the ratio of the SOCs is included in the predetermined full charging range, the sequential charging of the corresponding charging group may be stopped.

For example, the battery pack charging apparatus 500 is configured to determine that the battery pack is fully charged when an average SOC of the charging groups of the connected battery pack exceeds about 90% and an SOC deviation between the charging groups is smaller than about 5%, and in this case, the charging of the corresponding charging group can be stopped.

Meanwhile, as the monitored result of the battery information, when the battery pack does not reach the charging condition and the sequential charging continues, the battery pack charging apparatus 500 compares the individual group control factor with the preset critical value and determines whether the charging factors of the charging group are adjusted (750). The individual group control factor includes any one or any combination of two or more of voltages, overpotential, ion concentration distribution, temperatures of the charging groups of the battery pack, but is not limited thereto.

For example, the battery pack charging apparatus 500 adjusts to decrease the pulse current of the corresponding charging group to a predefined pulse current value when a temperature of the charging group exceeds the preset critical value. However, there is no limitation, and the individual group control factor may be determined differently according to a user's or an operator's expressed intention, performance of the battery pack and specification of the battery pack charging apparatus.

For example, when the SOC of the charging group exceeds about 90%, in order to reduce danger of damage and explosion of the battery pack due to overcharging, the battery pack charging apparatus 500 adjusts the charging factor of the corresponding charging group to apply a pulse current that is ⅕ of the previous charging pulse current to perform the charging.

In addition, the battery pack charging apparatus 500 determines whether the charging factor of the charging group is adjusted by comparing the pack control factor with the preset critical value when the individual group control factor does not exceed the critical value. Here, the pack control factor includes any one or any combination of two or more of: the charging groups or a temperature deviation, an SOC deviation and an SOH deviation between the individual battery cells and/or modules included in the charging groups and is not limited thereto.

For example, the battery pack charging apparatus 500 decreases the pulse current of the charging group having a maximum SOC value among the charging groups of the battery pack to 0.3 C (C-rate) when an average SOC of the charging groups of the connected battery pack is 50% or more and an SOC deviation of each of the charging group is 10% or more.

For the convenience of description, while FIG. 7 shows that the charging factors of the charging groups are adjusted by comparing the pack control factor with the preset critical value (760) when the individual group control factor does not exceed the predetermined critical value, there is no limitation, and even when the individual group control factor exceeds the critical value to adjust the charging factor of the charging group, the battery pack charging apparatus 500 may be used to compare the pack control factor with the preset critical value to adjust the charging factors of the charging groups.

The battery pack charging apparatus 500 adjusts the charging factor of the corresponding charging group when the individual group control factor or the pack control factor exceeds the critical value as a result of comparing the individual group control factor and the pack control factor with the preset critical value (770). However, there is no limitation, and the sequential charging may be performed through a method of excluding the corresponding charging group having the individual group control factor larger than the predefined critical value from the sequential charging.

When the charging factor of the charging group is adjusted, the battery pack charging apparatus 500 determines whether the group liaison control of controlling the charging factor is performed through liaison to another charging group (780).

For example, when the battery pack charging apparatus 500 determines the group liaison control according to a ratio of reaching the charging condition of the charging groups of the battery pack, on the assumption that the charging condition is the constant duration charging of the battery pack, the battery pack charging apparatus 500 performs the liaison control of the charging groups by calculating a remaining charging capacity ratio of each of the charging groups with reference to the full charging capacity or calculating an imaginary chargeable capacity based on a designated duration.

For example, the battery pack charging apparatus 500 adjusts the current of the corresponding charging group and liaison-adjusts the pulse current of the remaining charging group when a voltage of a charging group exceeds 4.2 V and the magnitude of the pulse current is adjusted by lowering by 0.5 C (C-rate) (790).

For example, when the pulse current of the charging group is adjusted, the battery pack charging apparatus 500 adjusts the pulse current of the remaining charging group based on a Δ SOC ratio to be charged of the remaining charging group with reference to the SOC value using the magnitude of the pulse current as a maximum current when the magnitude of the pulse current of the corresponding charging group is used as a reference. However, there is no limitation, and the battery pack charging apparatus 500 may be actuated to adjust only the charging factor of the corresponding charging group and may also independently control the charging factors of the remaining charging groups based on the battery information of the charging group. In addition, when the magnitude of the adjusted pulse current exceeds the magnitude of the maximum pulse current according to the SOC, the battery pack charging apparatus 500 sets the magnitude of the pulse current to a maximum current value according to the SOC of the charging group.

As another example, the battery pack charging apparatus 500 liaison-controls the charging factors of the other charging groups according to the ratio of reaching the charging condition of each of the charging groups when the adjusted charging factor of the charging group is set to be deviated from the safety range and the corresponding charging factor is adjusted. For example, the battery pack charging apparatus 500 initializes the pulse maintaining duration to the initial setting value (for example, 1 second) when the adjusted pulse maintaining duration among the charging factors of the charging group is set to be smaller (for example, 0.1 second) than the preset minimum maintaining duration (for example, 0.5 seconds). Here, the battery pack charging apparatus 500 controls the pulse current magnitude of each of the charging groups together with initialization of the pulse maintaining duration through liaison control. For example, the battery pack charging apparatus 500 adjusts the pulse current magnitudes of the charging group in which the pulse maintaining duration is initialized and the other charging groups to the common pulse current magnitude, and adjusts the pulse maintaining durations of the other charging groups based on the ratio reaching the charging condition of each of the charging groups through liaison control. As described above, the battery pack charging apparatus 500 liaison-adjusts the pulse current magnitudes of the charging groups and the pulse maintaining durations of the other charging groups upon adjustment of the charging factor such as initialization of the pulse maintaining durations of some of the charging groups.

Next, the battery pack charging apparatus 500 continues to perform the sequential charging of the groups using the varying charging factor by reflecting the varying battery information according to progress of the sequential charging (720).

The battery pack charging apparatus according to one or more embodiments includes a processor. The processor sets the charging factors of the charging groups of the battery pack based on the received battery information. The charging group is a basic unit that is sequentially charged and battery modules or battery cells of the battery pack are set as a unit. For example, each of the battery modules may be set as a charging group, and two or more battery modules may be set as a charging group. In addition, two or more battery cells may be set as a charging group.

When the charging factor is set, the processor sequentially charges the charging groups according to the set charging factors and may control the charging of the charging groups based on either one or both of the individual group control factor and the pack control factor during the sequential charging.

Here, the sequential charging of the battery pack and control thereof may be implemented by the processor according to the battery pack charging method shown in FIGS. 6 and 7.

In addition, the processor of the battery pack charging apparatus may be independently constituted by a separate processor according to a performed function. For example, while a processor may perform all of a series of processes related to the charging of the battery pack, a processor configured to monitor a battery state and a processor configured to perform sequential charging may be constituted by separate processors.

Figure 8:
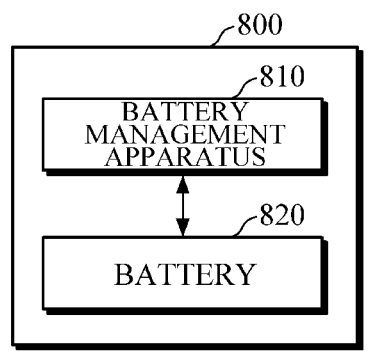
FIG. 8 is a block diagram illustrating a battery management system according to an embodiment.

FIG. 8 is a block diagram of a battery management system according to an embodiment.

Referring to FIG. 8, a battery management system 800 includes a battery management apparatus 810 and a battery 820.

The battery management apparatus 810, according to one or more embodiments, may be applied to the battery pack charging apparatuses 100 and 500 shown in FIGS. 1 and 5.

The battery management apparatus 810 monitors the battery information for setting the charging factors when the battery 820 is connected thereto. When the battery information is collected, the battery management apparatus 810 sets the charging groups of the battery 820 connected for the sequential charging based on the battery information. Here, the battery 820 is a battery pack including a plurality of battery modules connected in serial and/or parallel. In addition, each of the battery modules included in the battery pack includes a plurality of individual battery cells, and each of the battery modules or the battery cells is secondary battery such as a nickel metal battery, a lithium ion battery, or the like.

For example, referring to FIG. 2, as the monitored result of the battery information, when the battery 820 of the battery management system 800 is the battery pack A, the battery management apparatus 810 sets the battery module 1 to a charging group 1, the battery modules 2 and 3 to a charging group 2, and the battery module 4 to a charging group 3 based on the SOCs of the battery modules.

The battery management apparatus 810 sets the charging factors of the charging groups for the sequential charging of the set charging groups, performs the sequential charging of the charging groups of the battery 820 based on the set charging factor, and controls the charging of the charging group based on either one or both of the individual group control factor and the pack control factor while the charging is performed.

The charging factor setter 110/510, sequential charger 120/520, charging controller 130/540, monitor 530, and group setter 550 in FIGS. 1 and 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3A-D, 6 and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery pack charging apparatus comprising battery modules assigned to charging groups, the battery pack charging apparatus comprising:
   a charging factor setter configured to set charging factors of one or more charging groups of a battery pack based on battery information;
   a sequential charger configured to sequentially charge the one or more charging groups of the battery pack based on the charging factors of the set charging groups; and
   a charging controller configured to control charging of the one or more charging groups based on either one or both of an individual group control factor and a pack control factor while the one or more charging groups are sequentially charged,
   wherein the assigning of the battery modules to the charging groups is adjusted based on changes in the battery information during the sequential charging.

2. The battery pack charging apparatus according to claim 1, further comprising:
   a group setter configured to set the one or more charging groups with either one or both of battery cells and battery modules of the battery pack as a standard unit based on any one or any combination of two or more of performance of the battery cell or the battery module, a maximum allowable peak power, and a state of health (SOH) of the battery pack charging apparatus.

3. The battery pack charging apparatus according to claim 2, further comprising:
   a monitor configured to monitor a charging state during charging of the one or more charging groups and collect the battery information of at least one of the battery cell, the battery module and the charging group,
   wherein the group setter is further configured to adjust the one or more charging groups based on the battery information collected during charging of the one or more charging groups.

4. The battery pack charging apparatus according to claim 1, wherein the charging factor of each of the one or more charging groups comprises any one or any combination of two or more of a magnitude of a pulse current, a pulse current maintaining duration, and a pulse period of the one or more charging groups.

5. The battery pack charging apparatus according to claim 4, wherein the sequential charger is further configured to sequentially apply a pulse current to a first of the one or more charging groups according to the set charging factors of the one or more charging groups, and to apply a pulse current to a second of the one or more charging groups during a pause duration of a charging of a previous charging group.

6. The battery pack charging apparatus according to claim 1, wherein the charging controller is further configured to
   determine whether the one or more charging groups has reached a charging condition during charging of the one or more charging groups, and
   generate a comparison result by comparing either one or both of the individual group control factor and the pack control factor with a preset critical value and adjust the charging factor of the one or more charging groups based on the comparison result when the one or more charging groups has not reached the charging condition.

7. The battery pack charging apparatus according to claim 6, wherein the charging controller is further configured to generate a compared result by comparing a pulse maintaining duration of the adjusted charging factors to a preset minimum maintaining duration and to initialize the pulse maintaining duration to an initial value based on the compared result.

8. The battery pack charging apparatus according to claim 7, wherein the charging controller is further configured to adjust the pulse current magnitudes of the one or more charging groups to a common pulse magnitude when the pulse maintaining duration is initialized.

9. The battery pack charging apparatus according to claim 6, wherein the charging controller is further configured to determine whether the one or more charging groups is fully charged based on the charging condition, and adjust one or both of a charging pulse magnitude and a charging pulse duration when the one or more charging groups is not fully charged.

10. The battery pack charging apparatus according to claim 6, wherein the individual group control factor comprises any one or any combination of two or more of a voltage, overpotential, ion concentration distribution, and temperature, and the pack control factor comprises any one or any combination of two or more of a temperature deviation, a state of charge (SOC) deviation and a state of health (SOH) deviation.

11. The battery pack charging apparatus according to claim 10, wherein the charging controller is further configured to adjust the charging factor of the one or more charging groups based on a maximum current of the charging group according to a SOC.

12. The battery pack charging apparatus according to claim 6, wherein the charging controller is further configured to
determine whether group liaison control is performed based on the charging condition and the battery information of the one or more charging groups, and
adjust the charging factors of the one or more charging groups through group liaison according to a ratio of the one or more charging groups reaching the charging condition when the liaison control of the one or more charging groups is determined.

13. The battery pack charging apparatus according to claim 12, wherein the charging controller is further configured to initialize a pulse maintaining duration of a first of the one or more charging groups in which the pulse maintaining duration is adjusted to be smaller than a preset minimum pulse maintaining duration, to an initial value, and adjust the pulse maintaining duration of a second of the one or more charging groups according to a ratio reaching the charging condition of each of the one or more charging groups.

14. The battery pack charging apparatus according to claim 1, wherein the assigning of the battery modules into the one or more charging groups is adjusted based on a change in one or more of a state of charge (SOC) of the battery and a state of health (SOH) of the battery.

15. The battery pack charging apparatus according to claim 1, wherein the one or more charging groups are set based on groups of battery modules that have one or more of a same state of charge (SOC) and a same state of health (SOH).

16. A battery pack charging apparatus comprising battery modules assigned to charging groups, the battery pack charging apparatus comprising:
a charging factor setter configured to set charging factors of charging groups of the battery pack based on battery information;
a sequential charger configured to sequentially charge the charging groups of the battery pack based on the charging factors of the set charging groups;
a charging controller configured to control charging of the charging groups based on either one or both of an individual group control factor and a pack control factor while the charging groups are sequentially charged;
a group setter configured to set the charging groups using either one or both of battery cells and battery modules of the battery pack as a standard unit based on any one or any combination of two or more of performance of the battery cell or the battery module, a maximum allowable peak power and a state of health (SOH) of the battery pack charging apparatus; and
a monitor configured to monitor a charging state during charging of the charging groups and collect the battery information using at least one unit of the battery cell, the battery module and the charging group,
wherein the group setter is further configured to adjust the charging groups based on the battery information collected according to progress of the charging of the charging groups.

17. A method of charging a battery pack comprising battery modules assigned into charging groups, the method comprising:
setting charging factors of one or more charging groups of the battery pack based on battery information of the one or more charging groups;
sequentially charging the one or more charging groups of the battery pack based on the set charging factors of the charging groups; and
controlling charging of the one or more charging groups based on either one or both of an individual group control factor and a pack control factor while the charging groups are sequentially charged,
wherein the assigning of the battery modules to the charging groups is adjusted based on changes in the battery information during the sequential charging.

18. The battery pack charging method according to claim 17, further comprising: setting the one or more charging groups with either one or both of battery cells or battery modules of the battery pack as a standard unit based on any one or any combination of two or more of performance of the battery cell or the battery module, a maximum allowable peak power, and a state of health (SOH) of the battery pack charging method.

19. The battery pack charging method according to claim 18, further comprising:
monitoring a charging state during charging of one of the one or more charging groups and collecting the battery information of at least one of the battery cell, the battery module and the charging group,
wherein in the setting of the charging groups, the one or more charging groups are adjusted based on battery information collected during charging of the one or more charging groups.

20. The battery pack charging method according to claim 17, wherein the charging factors of the one or more charging groups comprise any one or any combination of two or more of a magnitude of a pulse current of each of the charging groups, a pulse current maintaining duration and a pulse period of the one or more charging groups.

21. The battery pack charging method according to claim 20, wherein, in performing the sequential charging, the pulse current is sequentially applied to a first of the one or more charging groups according to the set charging factors of the one or more charging groups, and the pulse current is applied to a second of the one or more charging groups during a pause duration of a charging of a previous charging group to which the pulse current is applied.

22. The battery pack charging method according to claim 17, wherein, the controlling of the charging of the one or more charging groups comprises
determining whether one or more charging groups has reached a charging condition during charging of the one or more groups, and
generating a comparison result by comparing either one or both of the individual group control factor and the pack control factor with a preset critical value and adjust the charging factor of the one or more charging groups based on the comparison result when the one or more charging groups has not reached the charging condition.

23. The battery pack charging method according to claim 22, wherein, in the controlling of the charging of the one or more charging groups, a compared result is generated by comparing a pulse maintaining duration of the adjusted charging factors with a preset minimum maintaining duration and the pulse maintaining duration is initialized to an initial value based on the compared result.

24. The battery pack charging method according to claim 23, wherein, in the controlling of the charging of the one or more charging groups, the pulse current magnitudes of the one or more charging groups is adjusted to a common pulse current magnitude when the pulse maintaining duration is initialized.

25. The battery pack charging method according to claim 22, comprising
determining whether the one or more charging groups is fully charged based on the charging condition, and
adjusting one or both of a charging pulse magnitude and a charging pulse duration of the one or more charging groups when the full charge is not achieved.

26. The battery pack charging method according to claim 22, wherein the individual group control factor comprises any one or any two or more of a voltage, overpotential, ion concentration distribution and temperature, and
the pack control factor comprises either one or both of a temperature deviation, a state of charge (SOC) deviation and a state of health (SOH) deviation.

27. The battery pack charging method according to claim 26, wherein, in the controlling of the charging of the charging groups, the charging factor of one or more of the charging groups is adjusted based on a maximum current of the charging groups according to a SOC.

28. The battery pack charging method according to claim 22, further comprising
determining whether group liaison control is performed based on the charging condition and the battery information of the one or more charging groups, and
adjusting the charging factors of the one or more charging groups through group liaison according to a ratio of the one or more charging groups reaching the charging condition when the liaison control of the one or more charging groups is determined.

29. The battery pack charging method according to claim 28, wherein, in the controlling of the charging of the charging groups, the pulse maintaining duration of a first of the one or more charging groups in which the pulse maintaining duration is adjusted to be smaller than a preset minimum pulse maintaining duration is initialized to an initial value, and the pulse maintaining duration of a second of the one or more charging groups is adjusted according to a ratio reaching the charging condition of each of the one or more charging groups.

30. A battery pack charging apparatus comprising battery modules assigned into charging groups, the battery pack charging apparatus comprising:
a processor,
wherein the processor is configured to
set charging factors of one or more charging groups of a battery pack based on battery information,
sequentially charge the one or more charging groups of the battery pack based on the charging factors of the set charging groups, and
control charging of the one or more charging groups based on either one or both of an individual group control factor and a pack control factor while the one or more charging groups are sequentially charged,
wherein the assigning of the battery modules to the charging groups is adjusted based on changes in the battery information during the sequential charging.

31. A battery management system comprising:
a battery comprising battery modules assigned into one or more charging groups; and
a battery management apparatus configured to
sequentially charge the one or more charging groups of the battery, and
control charging of the one or more charging groups based on either one or both of an individual group control factor and a pack control factor while the charging groups are sequentially charged,
wherein the assigning of the battery modules into the one or more charging groups is adjusted based on changes in the battery information during the sequential charging.

* * * * *